United States Patent
Cramer et al.

(10) Patent No.: US 9,346,090 B2
(45) Date of Patent: *May 24, 2016

(54) METHOD AND DEVICE FOR DEPOSITING A METAL COIL

(75) Inventors: Ulrich Cramer, Attendorn (DE); Thomas Holzhauer, Kirchhundem (DE); Wolfgang Fuchs, Hilchenbach (DE); Andreas Kastner, Kirchhundem (DE); Christian Mengel, Siegen (DE); Heinz-Adolf Mueller, Wilnsdorf (DE); Carsten Heide, Netphen (DE); Karl Robert Hofmann, Netphen (DE)

(73) Assignee: SMS Group GmbH, Duesseldorf (DE)

( * ) Notice: Subject to any disclaimer, the term of this patent is extended or adjusted under 35 U.S.C. 154(b) by 729 days.

This patent is subject to a terminal disclaimer.

(21) Appl. No.: 13/634,019

(22) PCT Filed: Mar. 14, 2011

(86) PCT No.: PCT/EP2011/053822
§ 371 (c)(1),
(2), (4) Date: Dec. 7, 2012

(87) PCT Pub. No.: WO2011/110696
PCT Pub. Date: Sep. 15, 2011

(65) Prior Publication Data
US 2013/0071223 A1    Mar. 21, 2013

(30) Foreign Application Priority Data

Mar. 12, 2010 (DE) .................. 10 2010 011 171
Aug. 27, 2010 (DE) .................. 10 2010 035 690
Dec. 10, 2010 (DE) .................. 10 2010 062 865

(51) Int. Cl.
B23Q 17/00    (2006.01)
B21C 47/24    (2006.01)
(Continued)

(52) U.S. Cl.
CPC .............. *B21C 47/24* (2013.01); *B21C 47/326* (2013.01); *F16M 11/00* (2013.01); *Y10T 29/49764* (2015.01)

(58) Field of Classification Search
CPC .............. B21B 2015/0057; B21B 2015/0064; B21B 38/02; B21C 47/24; B21C 47/063; B21C 47/08; B21C 47/22; B21C 51/00; B65H 16/08; B65H 18/02; B65H 2301/4172
USPC .......... 242/363, 527; 29/271, 407.01, 407.05, 29/407.09, 709, 712, 714, 721, 722, 773; 72/129, 146, 148, 183, 203, 250, 252; 83/649

See application file for complete search history.

(56) References Cited

U.S. PATENT DOCUMENTS 3,557,591 A * 1/1971 Lind .............................. 72/130
4,005,830 A * 2/1977 Smith ....................... 242/533.3
(Continued)

FOREIGN PATENT DOCUMENTS

DE    1940426    3/1970
DE    2806245    8/1979
(Continued)

*Primary Examiner* — Gregory Adams
(74) *Attorney, Agent, or Firm* — Abelman, Frayne & Schwab

(57) ABSTRACT

The invention relates to a method and a device for depositing a metal coil (200) on two stationary support points (110-1; 110-2). In order to be able to deposit even metal coils that have high internal residual stress in a stable manner on the two support points, according to the invention, a third support point (140) is pivoted against the outer circumference of the metal coil (200) if needed.

25 Claims, 1 Drawing Sheet

(51) Int. Cl.
*B21C 47/32* (2006.01)
*F16M 11/00* (2006.01)

(56) References Cited

U.S. PATENT DOCUMENTS

| | | | |
|---|---|---|---|
| 4,096,724 A | | 6/1978 | Eshelman |
| 4,854,806 A | | 8/1989 | Gertsch |
| 5,044,862 A | | 9/1991 | Herigstad |
| 5,987,955 A * | 11/1999 | Benner ................... 72/250 |
| 6,588,245 B2 * | 7/2003 | O'Fathaigh ............... 72/150 |
| 7,059,161 B2 * | 6/2006 | Armenat et al. ............ 72/11.7 |
| 7,314,196 B2 | | 1/2008 | Gandelheidt |
| 8,096,158 B2 | | 1/2012 | Moser |
| 2008/0190258 A1 * | 8/2008 | Moser et al. ............... 83/649 |

2010/0294874 A1    11/2010    Niehues

FOREIGN PATENT DOCUMENTS

| | | |
|---|---|---|
| DE | 2901454 | 7/1980 |
| DE | 4334582 | 4/1995 |
| DE | 19714551 | 10/1998 |
| DE | 102007017 | 8/2008 |
| EP | 1647508 | 4/2006 |
| JP | 555-43715 | 3/1980 |
| JP | 647438 | 2/1994 |
| JP | 2010005 631 | 1/2010 |
| JP | 2010253483 | 11/2010 |
| KR | 20030026479 | 4/2003 |
| WO | WO 2009056279 A1 * | 5/2009 |

* cited by examiner

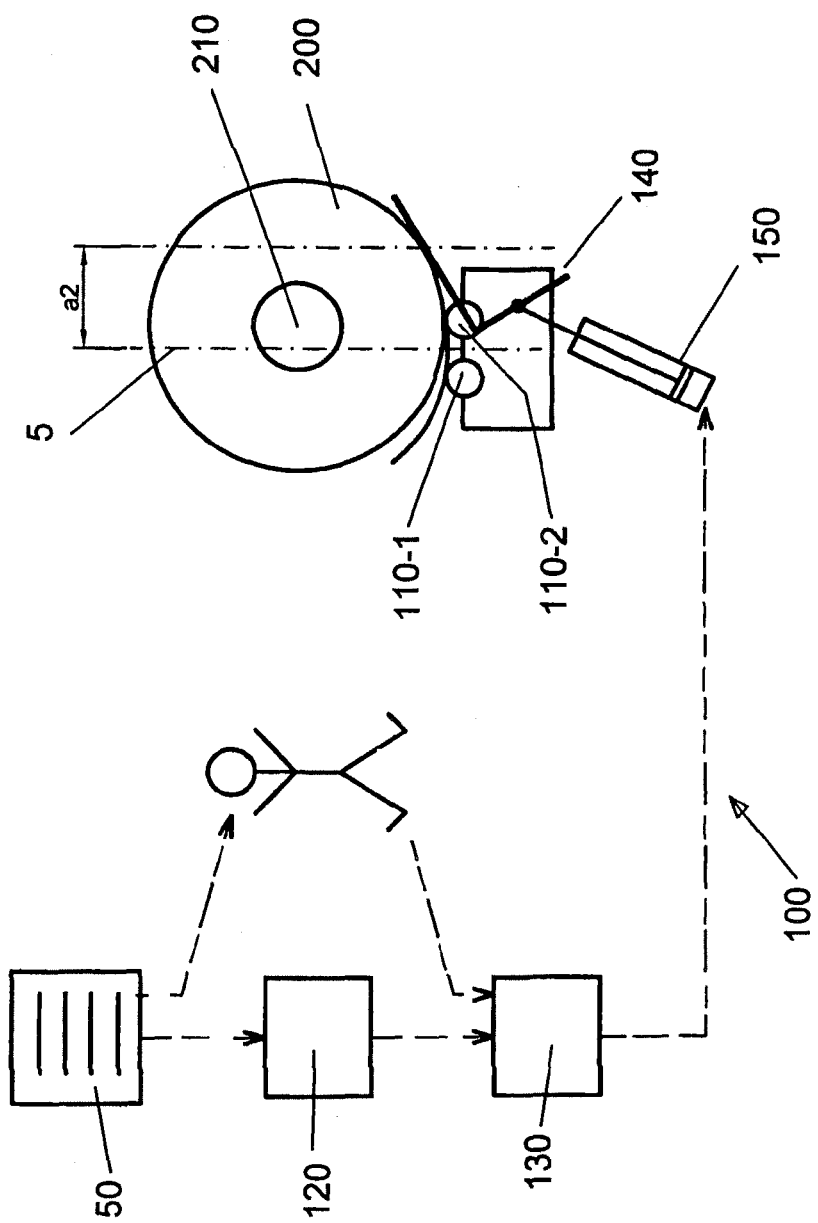

ced stress, and the strength of the material of the metal strip is greater than a predetermined threshold strength; and

METHOD AND DEVICE FOR DEPOSITING A METAL COIL

The invention relates to a method of depositing a metal strip wound into a coil on first and second support points of a device and to a device itself, e.g., in form of a coil buggy.

STATE OF THE ART

At production of a conventional hot strip, there is a tendency to use in the production materials having a high strength and a large strip thickness. Those are produced from tubular steels and with wearing surfaces. When these materials are wound, a coil has a residual stress that again opens strip ends. When the limit of the residual stress is exceeded, the coil can be deposited on the coil buggy off-center, be automatically lifted of the coil buggy, or spring up (clock spring effect).

In the state of the art, different devices and methods are known which are used for stable depositing and handling of wound material with a high residual stress.

Patent Publication WO 2006/111259 discloses a stationary device for sampling metal coils in which the coil is held in a stable position on a base roller with at least one press-on roller, with a usually stationary second base roller being lifted off the coil surface to obtain a suitable free strip length for sampling. The press-on roller is spaced from the stationary roller by more than 90°. The application further discloses devices and methods for sampling metal coils.

The not yet open patent application DE 10 2009 060 2577 discloses deposition of metal coils on a reel with extraction a coil length wherein the coil is supported on at least three support points. Here likewise, two support points are separated for taking samples of coils having different diameters. The drawback of this solution consists in that always three support points are available independent on whether they are necessary for a stable deposition of a metal coil in a particular case or not. The three support points for metal coils without high residual stress occupy an unnecessary large space.

Japanese Publication JP 60 47 438 A discloses a coil buggy with two support points for deposition of a metal coil. The support points are adjustably arranged on the coil buggy but positioned stationary relative to each other. Both support points are formed as rollers one of which can be driven with a motor and a chain drive.

Proceeding from the last mentioned state of the art, the object of the invention is to so improve the method and the device for depositing a metal coil on two support points that the metal coil can be supported more reliably.

This object is achieved by a method according to claim 1. The method is characterized by the following steps:
checking and determining whether a metal coil rests or would rest on both support points positioned relative to each other in an initial position, in an unstable equilibrium position, and in affirmative: depositing the metal coil on the two stationary support points as long as it was not carried out before within the frame of checking the equilibrium position, and placing at least one third movable support point against the outer circumference of the metal coil for stabilizing the metal coil on the device.

The term "unstable equilibrium position" means within the frame of the invention different risks or instabilities which can occur during handling and, in particular, during deposition of metal coils having a high residual stress. Because of the high residual stress, the metal coil can be deposited on a coil buggy off-center and because of the clock spring effect, spring up. Therefore, there exists a danger that the coil lifts automatically off the buggy and falls from the buggy. All these effects represent an unstable equilibrium position of the metal coil within the meaning of the present description.

The inventive merit of the invention lies in that a possibility is shown how such problematic metal coils can be recognized and, if needed, suitable measures can be taken to insure a reliable deposition of such metal coils on two support points.

The present invention proceeds from the fact that the first and second support points are stationary. I.e., during deposition of an unstable coil on the two support points, their relative position with respect to each other cannot be changed to stabilize the deposition of the metal coil on the first and second support points in this way. Thus, the deposition of the metal coil on the first and second points remain unstable. Still, in order to be able to insure the stabilization of the deposition, also for a later transportation of the coil, it is contemplated according to the invention to place a third displaceable support point against the outer circumference of the metal coil. The placement advantageously is so carried out that it counteracts against an undesirable displacement of the coil resulting from the coil inherent instability and/or internal residual stress.

The checking of the above-mentioned problematic characteristics of a metal coil can take place either when the metal coil already lies on both support points or, but only purely notially, when the metal coil would be deposited. For this reason, claim 1 recites ". . . rests or would rest." A complete understanding of these facts would be clarified during a later discussion of the embodiments of the invention.

According to the first embodiment, the checking and determination step includes the following sub-steps:
checking if the following condition is met, namely, whether:
the diameter of the metal coil is smaller than a threshold diameter, and the thickness of the metal strip is greater than a threshold thickness, and the strength of the material of the metal strip is greater than a threshold strength; and
manipulating determination that the metal coil would rest on both support points positioned relative to each other in an initial position, in an unstable equilibrium position when the condition is met.

This first possibility of checking takes place advantageously by a separate evaluation the above-mentioned criteria of the metal strip and the metal coil. For carrying out the checking, the metal coil need not actually be deposited on both support points. No expensive measurements of the metal coil itself or of the support points should be undertaken. For typically treated materials, the criteria can be provided in a table. Then, they can be quickly provided to a worker for a separate metal coil. The unstable equilibrium position, in the case when the metal coil is to be deposited on support points, is predicted or forecasted. Therefore, the mentioned determination of the unstable equilibrium position for this embodiment is simply manipulated in the sense of being implied, or assumed, or predicted.

Advantageously, the threshold diameter is set to be 2200 mm, the threshold thickness is set to be 5 mm, and the threshold strength, in particular, the tensile strength of a hot material is set to be 250 times $10^6 N/m^2$.

The examined condition according to the first possibility of checking of an unstable equilibrium condition, can additionally include the following criteria, namely, that the temperature of the metal coil is smaller than a predetermined threshold temperature, and the tensile strength of the hot material of the metal strip is greater than a predetermined threshold yield point. The condition is only then met when all of the criteria, including the additional ones, are met.

This has an advantage that in this case, the manipulated determination of an unstable equilibrium position is additionally guaranteed, and, thereby, is given more weight.

Advantageously, the threshold temperature is set to be 600° C., and the threshold yield point is set to be 250 times $10^6$N/m$^2$.

In addition to the first possibility, there exists a second possibility of checking and determination of the equilibrium position. This second possibility includes the following sub-steps: depositing the metal coil on both stationary support points; stationary dropping a plumb line from the center of the metal coil downwardly toward the support points; checking whether the plumb line is dropped between both support points; and determining that the metal coil rests on both support points in an unstable equilibrium position if the plumb line is not dropped in the middle between both support points at least within a predetermined threshold tolerance for the plumb line. The condition is only then met when all of the criteria, including additional criteria, are met. The second possibility has the advantage that it can be executed by a worker on site without a need in expensive and complex apparatuses.

Advantageously, the threshold tolerance for the plumb line lies, with reference to the middle between the support points, within +/−10% of the metal coil diameter.

In addition to the first and second possibilities, there exists a third possibility of checking and determination of the equilibrium position. The third possibility includes the following sub-steps: depositing the metal coil on both stationary support points, measuring a load applied to a first support point when the metal coil rests on both support points, comparing the measured load with a total weight of the metal coil, and determining that the metal coil rests on both support points in an unstable equilibrium position when the measured load applied to the first support point deviates from a half of the total weight of the metal coil by more than a predetermined load threshold tolerance. This third possibility requires, apart from a testing device with an integrated device for evaluation of the equilibrium, advantageously, only the measuring device on one of the two support points.

In addition to the first, second and third possibility, there exists a fourth possibility of checking and ascertaining the equilibrium position. The fourth possibility includes the following sub-steps: depositing the metal coil on both stationary support points, measuring a load applied to the first and second support points, respectively, when the metal coil rests on both support points, comparing the measured loads with each other, and determining that the metal coil rests on both support points in an unstable equilibrium position when the measured loads per a support point deviate from each other by more than a predetermined load threshold tolerance.

The load threshold tolerance for one of the support points at third and fourth possibility is set, preferably, to be +/−25%, more preferably, +/−10%, and even more preferably, +/−5% of the weight of the metal coil.

Generally, only one of the mentioned four possibilities for checking and determination of the equilibrium position is used, as long as alternative exists. Nevertheless, naturally, several possibilities can be used for a metal coil.

Advantageously, the third and, eventually, further displaceable support points are placed beneath the center line of the metal coil against its outer circumference so that they, in addition to both stationary support points, can take over, respectively, a portion of the entire weight of the metal coil.

Advantageously, the third and, eventually, further displaceable support points are placed beneath the center line against the circumference of the metal coil further outside of the two stationary support points. The third and a fourth support points can be placed mirror-symmetrically. Thereby, the security for the deposited metal coil increases further, in comparison with a more cramped placement.

The third support point is advantageously placed in the quadrant of the cross-section of the metal coil in which the stationary support point with a higher load is arranged during deposition of the metal coil. It is there where there is a danger that the metal coil would spring up or would jump down from the coil buggy at the earliest, which is advantageously prevented by placement of the third support point there.

According to the first alternative, the placement of the at least one third support point can be position-controlled, whereby the third support point is displaced in a dependent-on-the-diameter, set position and is there secured. The securing is necessary so that the force, which may result from an eventual displacement of the metal coil, will be taken over or compensated by it to stop an undesirable movement of the metal coil.

According to the second alternative, the placement of the at least one third support point can be position-controlled, whereby the third support point is displaced in a dependent-on-the-diameter, set position and the set position, if necessary, by applying force against the metal coil by the control device, which controls the positioning, is retained by an appropriate regulation. In this case, no locking of the support point in the set position takes place. With position regulation, retaining or reaching the set position is monitored by the positioning device.

Finally, placement of the at least third support point can be carried out, according to third alternative, by a force control, whereby the third support point is placed against the outer circumference by a pressure force, and the pressure force is adjusted to a predetermined set value.

The placement of at least third support point against the metal coil is carried out without changing the unstable deposition of the metal coil on both stationary support points. The stability of the deposition, according to the present invention, is provided only by placement of the at least third support point against the metal coil.

For coils which do not require stabilization because of a small residual stress in the coil, the third support point can be so adjusted that it does not touch the coil. By a variable positioning of the third support point, it can be placed in a space-saving and protective manner in the construction beneath the two stationary support points. Thereby, it is possible to handle a coil from light and thin strip with a maximum production rate. Additionally, the time for placement of the third support point is dispensed with.

The at least third support point is placed against the metal coil in a horizontal region at a distance of X=200–1200 mm from the plumb line passing through the metal coil center.

As a device, a coil buggy or another such, stationary support is contemplated.

The method can be carried manually or automatically. The above-mentioned object is further achieved with a method according to claim 22.

It is important to note that the invention is not limited to a certain combination or package of shown features for checking the equilibrium position and for changing of the relative position of the support points with respect to each other. Rather, it relates to all combination and packages available, provided that they are technically feasible, can be combined, and are practically usable.

Further advantageous embodiments of the invention form the subject matter of dependent claims.

The description is based on FIG. 1 which shows an embodiment of the present invention.

FIG. 1 shows the inventive device, e.g., a coil buggy, for deposition and transportation of a metal strip wound into a coil, the device 100 has a first support point 110-1 and a second support point 110-2. Both support points are formed as rollers rotatably arranged on the device, preferably, at the same height, but are otherwise remain stationary. Stationary means that the support points do not displace relative to each other.

In addition to the support points, the inventive device includes a checking device 120 for checking and determining whether the metal coil rests or would rest on both stationary support points in a stable equilibrium position.

For checking an unstable equilibrium position different methods are used according to the invention, which are described about in a general portion of the description. One of these methods requires that the metal coil 200 actually rests on both stationary support points 110-1 and 110-2. According to another method, which is schematically represented in FIG. 1, the instability of the metal coil 200 is checked purely theoretically or abstractly by evaluation of different materials and metal coil parameters. Preferably, the condition is represented by criteria for a typical metal coil 200 provided in a table 50 so that a worker at the site can simply determine, by reading or evaluation of the table data, whether a certain metal coil 200, because of its inherent residual stress or resulting diverting equilibrium position, is risk-prone or not. Alternatively, to the worker consulting the table, the reading and evaluation can be taken over by the inventive checking device 120. The worker or the checking device 120 actuates, in case of a risk-prone metal band 200, a control device 130, which can also be formed as a regulating device, for setting a third support point 140, e.g., with a hydraulic cylinder 150, as shown in FIG. 1. The third support point is formed, e.g., as shown in FIG. 1, as an adjustable clap.

Advantageously, the third support point is adjusted only for those metal coils 200 the deposition of which, because of their high residual stress, on the two stationary support points 110-1 and 110-2 is problematic. Such a metal coil is shown in FIG. 1. Its deposition on the two stationary points 110-1 and 110-2 is problematic because it rests on both support points off-center. The off-center position is recognized by the fact that the middle of both support points through which a plumb line 5 extends, does not coincide with the middle 210 of the metal coil.

Because both support points 110-1 and 110-2 are stationary, the equilibrium position of the metal coil 200 cannot be stabilized on the two support points 110-1 and 110-2 by changing their position relative to each other. Rather, the deposition of the metal coil 200 on the two stationary support points is stabilized according to the invention by setting or placing the third support point 140 at a distance a2 from the vertical 5 on the out circumference of the metal coil 200.

The weight of a metal coil is proportional to its diameter. Thus, with the above-described first possibility for checking and determining the equilibrium position, alternatively or in addition to comparison the diameter of the metal coil with a threshold diameter, a comparison of the coil weight with a threshold coil weight can be carried out. Within the frame of the condition, therefore, in addition to the above-mentioned criteria, the weight of a respective metal coil should be smaller than the threshold coil weight for fulfilling the overall condition for a high residual stress. The threshold weight is about 30$t$. This criterium of weight comparison applies to all of the claimed methods and devices.

The invention claimed is:

1. A method of depositing a metal coil on a first stationary support point and a second stationary point of a device, characterized by the following steps:
   checking and determining whether the metal strip rests or would rest on both stationary support points in an unstable equilibrium position; and
   in affirmative,
   depositing the metal coil on the two stationary support points as long as it was not carried out before within the frame of checking the equilibrium position; and
   placing at least one third movable support point against the outer circumference of the metal coil for stabilizing the metal coil on the device.

2. A method according to claim 1,
   characterized in that
   the step of checking and determining the equilibrium position includes the following substeps:
   checking if the following condition is met:
   the diameter of the metal coil is smaller than a threshold diameter, and the thickness of the metal strip is greater than a threshold thickness, and the strength of the material of the metal strip is greater than a threshold strength; and
   manipulating determination that the metal coil would rest on both stationary support points in an unstable equilibrium position when the condition is met.

3. A method according to claim 2,
   characterized in that
   the threshold diameter is set to be 2200 mm;
   the threshold thickness is set to be 5 mm; and
   the threshold strength, in particular, the tensile strength of a hot material is set to be 250 times 106 N/m2.

4. A method according to claim 2,
   characterized in that
   the condition includes the following additional criteria:
   that the temperature of the metal coil is smaller than a predetermined threshold temperature, and the tensile strength of the hot material of the metal strip is greater than a predetermined threshold yield point; and
   manipulation of determination is carried out that the metal coil would rest on both stationary support points in an unstable equilibrium position when the additional criteria are met.

5. A method according to claim 4,
   characterized in that
   the threshold temperature is set to be 600° C., and the threshold yield point is set to be 250 times 106 N/m2.

6. A method according to claim 1,
   characterized in that
   the step of checking and determination of the equilibrium position includes the following sub-steps:
   depositing the metal coil on both stationary support points;
   dropping a plumb line from the center of the metal coil downwardly toward the support points;
   checking whether the plumb line is dropped between both support points; and
   determining that the metal coil rests on both support points in an unstable equilibrium position if the plumb line is not dropped in the middle between both stationary support points at least within a predetermined threshold tolerance for the plumb line.

7. A method according to claim 6,
characterized in that
the threshold tolerance for the plumb line lies, with reference to the middle between the support points, within +/−10% of the metal coil diameter.

8. A method according to claim 1,
characterized in that
the step of checking and determining the equilibrium position includes the following sub-steps:
depositing the metal coil on both stationary support points;
measuring a load applied to a first support point when the metal coil rests on both support points;
comparing the measured load with a total weight of the metal coil; and
determining that the metal coil rests on both support points in an unstable equilibrium position when the measured load applied to the first support point deviates from a half of the total weight of the metal coil by more than a predetermined load threshold tolerance.

9. A method according to claim 1,
characterized in that
the step of checking and determining the equilibrium position includes following sub-steps:
depositing the metal coil on both stationary support points;
measuring a load applied to the first and second support points, respectively, when the metal coil rests on both support points;
comparing the measured loads with each other; and
determining that the metal coil rests on both support points in an unstable equilibrium position when the measured loads per a support point deviate from each other by more than a predetermined load threshold tolerance.

10. A method according to claim 8,
characterized in that
the load threshold tolerance for one of the support points is set, preferably, to be +/−25%, more preferably, +/−10%, and even more preferably, +/−5% of the weight of the metal coil.

11. A method according to claim 1,
characterized in that
both support points are arranged at the same height next to each other in the initial position thereof.

12. A method according to claim 1,
characterized in that
a third and eventually further displaceable support points are placed beneath a central plane of the metal coil against an outer circumference thereof so that at least a portion of a total weight of the metal coil can be taken over.

13. A method according to claim 12,
characterized in that
the third and eventually further displaceable support points are placed against the circumference of the metal coil further outside than the two stationary support points.

14. A method according to claim 12,
characterized in that
the third support point is placed on a quadrant of a cross-section of the metal coil in which a stationary support point that has a higher load upon deposition of the metal coil, is arranged.

15. A method according to claim 12,
characterized in that
the third and a movable fourth support point are placed against the circumference of the metal coil mirror-symmetrically relative to the two stationary support points and, respectively, further outside in a lower half.

16. A method according to claim 1,
characterized in that
the placement of the at least third support point is positioned controlled while the third support point is displaced, dependent on a diameter of the metal coil in predetermined set position and is secured there.

17. A method according to claim 1,
characterized in that
the placement of the at least third support point is positioned controlled while the third support point is displaced, dependent on a diameter of the metal coil in predetermined set position and the set position, if necessary, is retained by force against the metal coil by a deviation control.

18. A method according to claim 1,
characterized in that
the placement of the at least third support point is force-controlled, while the third support point is placed against the outer circumference with a pressure force, and the pressure force is deviation-controlled to a predetermined set force value.

19. A method according to claim 1,
characterized in that the placement of at least the third point against the metal coil takes place without changing the unstable position of the metal coil on the two stationary support points.

20. A method according to claim 1,
characterized in that
the placement of the at least third support point against the metal coil does not take place when before a stable equilibrium position of the metal coil on both stationary support points has been determined.

21. A method according to claim 1,
characterized in that
the at least third point is placed against the metal coil in a horizontal region at a distance of x+200–1200 mm.

22. A method of depositing a metal coil on a first stationary support point and a second stationary support point of a device, characterized by the following steps:
checking if the following condition is met: the diameter of the metal coil is smaller than a threshold diameter, and the thickness of the metal strip is greater than a threshold thickness, and the strength of the material of the metal strip is greater than a threshold strength;
and when the condition is met:
manipulating determination that the metal coil would rest on both stationary support points;
depositing the metal coil on both stationary support points as long s it has not been done already before; and
placing at least one third movable support point against the outer circumference of the metal coil for stabilizing the metal coil on the device.

23. A method according to claim 22,
characterized in that
the third and eventually further displaceable support points are placed in the lower half of the metal coil against an outer circumference thereof so that at least a portion of a total weight of the metal coil can be taken over.

24. A method according to claim 22,
characterized in that
the third and eventually further displaceable support points are placed in the lower half of the metal coil against the circumference thereof further outside than the two stationary support points.

25. A method according to claim 22,
characterized in that
the at least third point is placed against the metal coil in a horizontal region at a distance of x=200–1200 mm.

* * * * *